(12) United States Patent  (10) Patent No.: US 8,056,210 B2
Gomyo et al.  (45) Date of Patent: Nov. 15, 2011

(54) MANUFACTURING METHOD FOR MOTOR

(75) Inventors: Masato Gomyo, Kyoto (JP); Yoichi Sekii, Kyoto (JP)

(73) Assignee: Nidec Corporation, Kyoto (JP)

( * ) Notice: Subject to any disclaimer, the term of this patent is extended or adjusted under 35 U.S.C. 154(b) by 902 days.

(21) Appl. No.: 11/860,586

(22) Filed: Sep. 25, 2007

(65) Prior Publication Data

US 2008/0080090 A1  Apr. 3, 2008

(30) Foreign Application Priority Data

Sep. 29, 2006 (JP) .................................. 2006-266842

(51) Int. Cl.
*H02K 15/00* (2006.01)

(52) U.S. Cl. ....... 29/596; 29/603.03; 219/675; 360/224; 384/107

(58) Field of Classification Search ............... 29/603.03, 29/596; 219/675, 672; 360/224; 384/107, 384/111, 112, 113
See application file for complete search history.

(56) References Cited

U.S. PATENT DOCUMENTS

| | | | | |
|---|---|---|---|---|
| 2,526,061 A * | 10/1950 | Batcheller | ...................... | 200/532 |
| 3,081,989 A * | 3/1963 | McBrien | ........................ | 266/127 |
| 5,266,764 A * | 11/1993 | Fox et al. | ....................... | 219/672 |
| 6,818,982 B2 * | 11/2004 | Kim | ................................ | 257/707 |
| 7,088,023 B1 * | 8/2006 | Gomyo et al. | ................... | 310/90 |
| 7,160,622 B2 | 1/2007 | Okamiya et al. | | |
| 2003/0051002 A1 * | 3/2003 | Bogia et al. | .................... | 709/218 |

FOREIGN PATENT DOCUMENTS

| | | |
|---|---|---|
| JP | 6-96199 | 11/1994 |
| JP | 2001-304263 | 10/2001 |
| JP | 2004-211851 | 7/2004 |
| JP | 3630736 | 12/2004 |
| JP | 3655492 | 3/2005 |

* cited by examiner

*Primary Examiner* — Livius R Cazan

(74) *Attorney, Agent, or Firm* — Keating & Bennett, LLP

(57) ABSTRACT

A sleeve portion is inserted into a hole portion of a base bracket on which an adhesive of heat cure type is applied while a rotor portion and a stator portion are retained by a position determining jig. Then, the sleeve portion is initially affixed to the base bracket by a high frequency induction heating of an induction coil. Then, the initial affixation is cured completely in an oven. Since the adhesive of heat cure type is used, generation of outgass will be minimized and a manufacturing cost of the motor having such components will be reduced.

16 Claims, 9 Drawing Sheets

MANUFACTURING METHOD FOR MOTOR

BACKGROUND OF THE INVENTION

1. Field of the Invention

The present invention relates to a technology for manufacturing a motor and a disk drive apparatus, and more particularly, to a technology for manufacturing a motor in which a sleeve portion into which a shaft will be inserted is affixed via an adhesive to a hole portion arranged at a base portion.

2. Description of the Related Art

Conventionally, an adhesive is used for assembling various components of a spindle motor used for rotating a discoid disk (e.g., storage medium) in a disk drive apparatus such as a hard disk drive, or the like.

For example, according to Japanese Laid-Open Patent Publication No. 2005-114106, a base frame and a bearing sleeve are affixed to one another temporarily by an anaerobic adhesive and then by an ultraviolet thermoset adhesive for a secure connection. By such method, a precise assembly between the base frame and the bearing sleeve is achieved without large scale equipment.

Also, according to Japanese Laid-Open Patent Publication No. 2006-191735, a highly responsive adhesive (e.g., an adhesive that is epoxy based, and fast curing at a normal temperature, or a single component high frequency induction heating epoxy based adhesive, or the like) is used to affix a magnet at an inner circumferential surface of a rotor frame which will be heated by a high frequency induction heating apparatus.

Also, according to Japanese Laid-Open Publication No. 2004-15955, an adhesive is applied at a stator portion of a frame or a stator core which will be heated so as to cure the adhesive.

Note that reading errors and/or writing errors may be caused in a hard disk drive apparatus in which an inner space thereof is filled with an outgass generated by the adhesive used in the motor.

In general, the anaerobic adhesive and the adhesive of an ultraviolet cure type are more likely to generate the outgass than the adhesive of the heat cure type, and therefore not suitable for use in the hard disk drive which is expected to perform with precision (see Japanese Laid-Open Publication No. 2005-114106).

Also note that the heat cure type adhesive requires a long period of time to cure and therefore the sleeve portion which is attached to the rotor portion and the base portion need to be retained by a jig in order to maintain the accurate position with respect to each other while they are cured in an oven for a long period of time. That is, a large space inside the oven and large size jigs will be required in order to manufacture such motor increasing the manufacturing cost of such motor, and preventing an automation of the manufacture.

SUMMARY OF THE INVENTION

In order to overcome the problems described above, preferred embodiments of the present invention provide a spindle motor preferably including a base portion which is a stator portion and includes a hole portion extending along a central axis, and a sleeve portion affixed at the hole portion.

A manufacturing method of the spindle motor includes the steps of applying an adhesive of heat curing type on at least one of an outer circumferential surface of the sleeve portion and an inner circumferential surface of the base portion including the hole portion, arranging the hole portion and the sleeve portion in the axial direction and inserting the sleeve portion into the hole portion from an upper side thereof, and heating an area surrounding the hole portion by a heating portion arranged near or at a bottom surface of the base portion.

According to a preferred embodiment of the present manufacturing method, the adhesive of heat curing type will be used in order to affix the sleeve portion and the base portion, which will reduce the manufacturing cost of the motor having such components.

By virtue of such manufacturing method, the manufacturing cost of the motor will be reduced and the generation of the outgass will be minimized.

Since the high frequency induction heating is used to heat the area surrounding the hole portion, the heating will be conducted facilitatedly and over heating of the sleeve portion will be minimized. Also, by virtue of such manufacturing method, reliability of the hard disk drive having such spindle motor manufactured in accordance with the present invention will be improved.

Other features, elements, steps, characteristics and advantages of the present invention will become more apparent from the following detailed description of preferred embodiments thereof with reference to the attached drawings.

Figure 1:
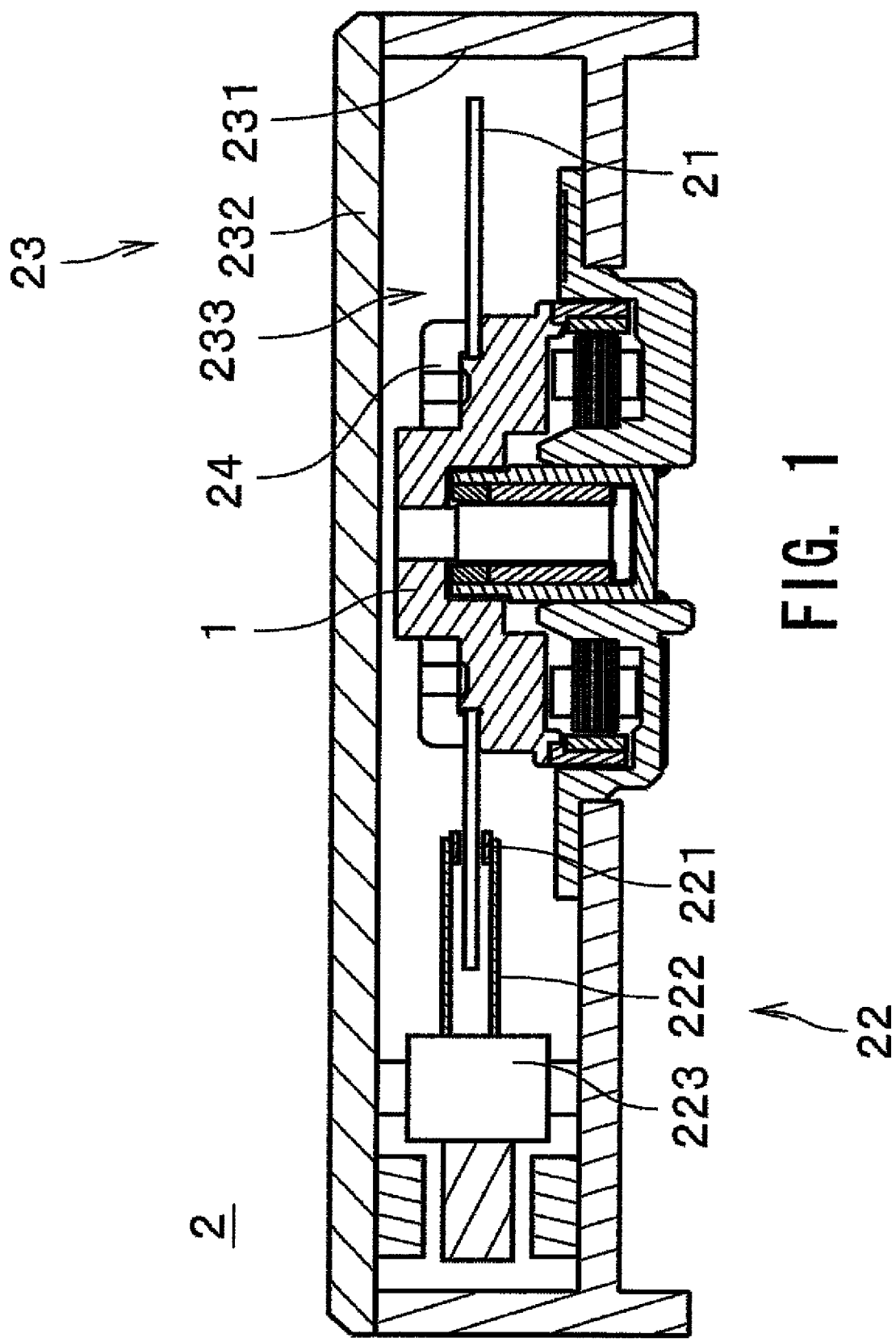
FIG. 1 is a cross sectional view of a disk drive apparatus.

Hereinafter, a first preferred embodiment of the present invention will be described with reference to FIGS. 1 to 9. Note that in the description of preferred embodiments of the present invention herein, words such as upper, lower, left, right, upward, downward, top and bottom for describing positional relationships between respective members and directions merely indicate positional relationships and directions in the drawings. Such words do not indicate positional relationships and direction of the members mounted in an actual device. Also note that reference numerals, figure numbers and supplementary descriptions are shown below for assisting the reader in finding corresponding components in the description of the preferred embodiments below to facilitate the understanding of the present invention. It is understood that these expressions in no way restrict the scope of the present invention.

FIRST PREFERRED EMBODIMENT

FIG. 1 is a cross sectional view of a disk drive apparatus 2 having an electrically powered spindle motor (hereinafter, referred to as motor 1) according to a first preferred embodiment of the present invention. The disk drive apparatus 2 is a hard disk apparatus preferably including a discoid storage medium 21 for storing therein information, an access portion 22, the motor 1 and a housing 23.

The access portion 22 writes information on and reads information from the storage medium 21. The motor 1 retains and rotates the storage medium 21. The housing 23 accommodates therein the storage medium 21, access portion 22 and the motor 1 so as to isolate them from outside.

The housing 23 preferably includes a first housing member 231 and a second housing member 232 of a plate shape. The first housing member 231 preferably includes an opening at an upper portion thereof, and has attached to the motor 1 and the access portion 22 at a lower portion thereof. The second housing member 232 covers the opening portion of the first housing member 231 so as to generate an inner space 233.

The inner space 233 generated in the housing 23 of the disk drive apparatus 2 including the first housing member 231 and the second housing member 232 is an extremely clean space allowing therein substantially no dust.

The storage medium 21 is affixed to the motor 1 by a clamper 24. The access portion 22 preferably includes a head 221, an arm 222 supporting the head 221, a magnetic head 221, and a head moving mechanism 223. The magnetic head 221 approaches the storage medium 21 so as to read information therefrom. The head moving mechanism 223 moves, by moving the arm 222, the head 221 relatively to the storage medium 21 and the motor 1. By virtue of such configuration, the head 221 is allowed to move to a necessary portion of the storage medium 21 and write information on and read information from the storage medium 21.

Figure 2:
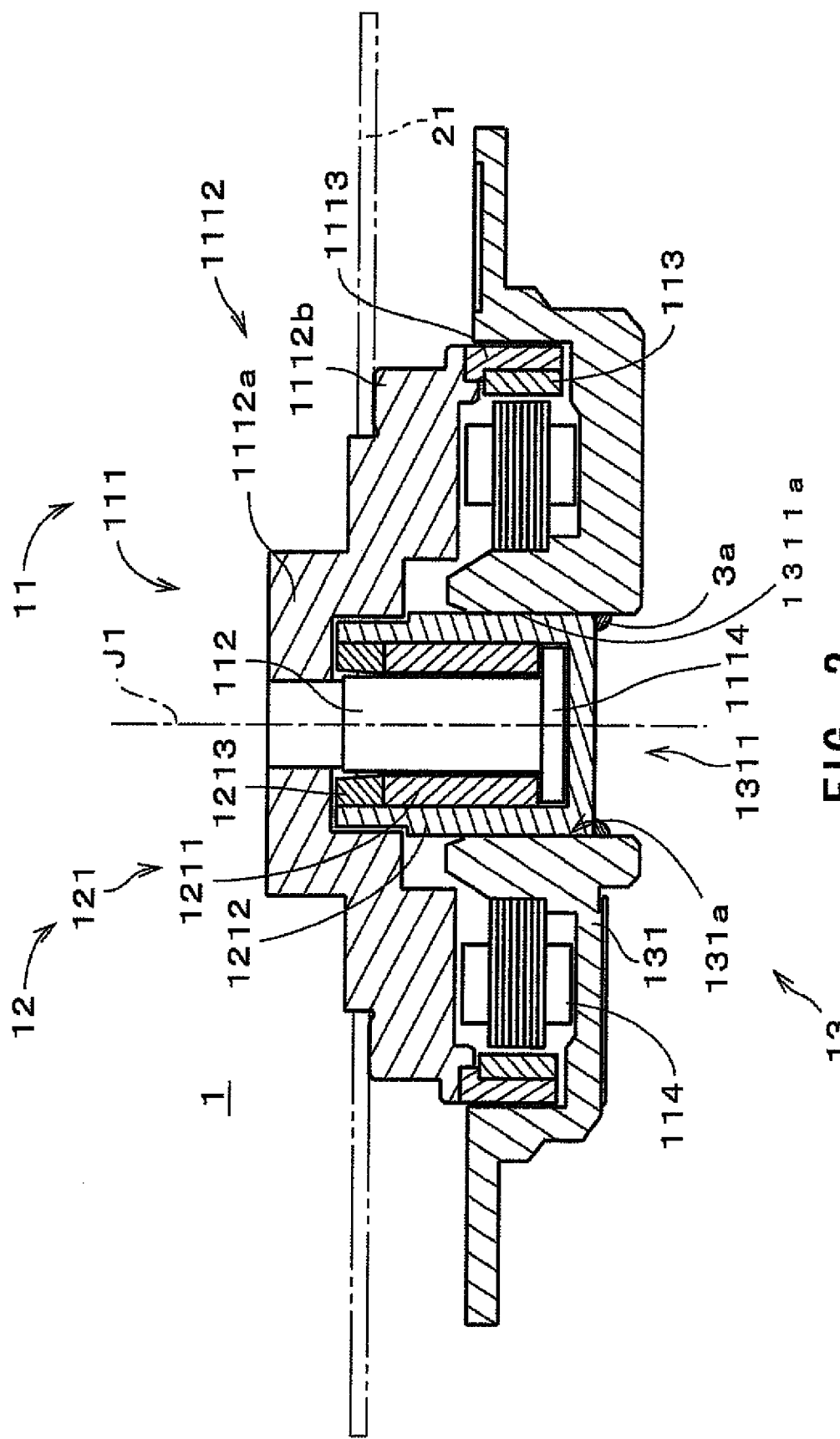
FIG. 2 is a cross sectional view of a motor.

FIG. 2 is a cross sectional view of the motor 1 which is used for rotating the storage medium 21. Note that, in FIG. 2, the storage medium 21 is indicated by a chain double dashed line. Also, as shown in FIG. 2, the motor 1 is an outer rotor type motor preferably including a rotor portion 11 and a stator portion 13.

The rotor portion 11 is rotatably supported by the stator portion 13 via a bearing mechanism 12 utilizing a fluid dynamic pressure centering about the central axis J1 of the motor 1.

The rotor portion 11 preferably includes a rotor hub 111, a shaft 112 and a rotor magnet 113. The rotor hub 111 preferably has affixed thereon the storage medium 21 and retains components of the rotor portion 11. The shaft 112 of a substantially cylindrical shape centering about the central axis J1 preferably protrudes in a downward direction from the rotor hub 111. The rotor magnet 113 affixed to the rotor hub 111 is arranged around the central axis J1. The rotor magnet 113 which is a multi-polarized magnet of a substantially annular shape generates a rotary force (torque) between a stator 114 (described later) and the central axis J1.

The rotor hub 111 preferably includes a hub 1112 of a substantially discoid shape, and a yoke 1113. The hub 1112 to which the shaft 112 is attached at a top end portion thereof extends in an outward direction. The yoke 1113 of a substantially cylindrical shape preferably protrudes in the downward direction from an outer circumference of the hub 1112, and has attached thereon the rotor magnet 113 at an inner circumferential surface.

The hub 1112 which is preferably made of a material such as aluminum (A1) or aluminum alloy includes a concaved portion 1112a and a disk mounting portion 1112b. The concaved portion 1112a preferably includes a portion protruding in an upward direction so as to fit a central opening portion of the storage medium 21. The disk mounting portion 1112b of a substantially annular shape centering about the central axis J1 has arranged thereon the storage medium 21.

The yoke 1113 made of a ferromagnetic material (e.g., stainless steel) is arranged at a lower portion of the disk mounting portion 1112b.

The shaft 112 also made of a material such as stainless steel is arranged by a method such as force fit at the concaved portion 1112a of the hub 1112. The shaft 112 has attached at a bottom end portion thereof a thrust plate 1114 of a substantially discoid shape.

The stator portion 13 preferably includes a base bracket 131 which is a base portion, and a stator 114. The base bracket 131 includes at a center thereof a hole portion 1311 around which a base bracket 131 is arranged.

A sleeve portion 121 which is a portion of the bearing mechanism 12 is inserted in the hole portion 1311 via an adhesive of heat curing type. Note that the base bracket 131 is made of aluminum which is a conductive member.

The sleeve portion 121 preferably includes a sleeve 1211 of a substantially cylindrical shape concentric with the central axis J1, a sleeve housing 1212 of a substantially cylindrical shape, and a seal cap 1213. The sleeve housing 1212 preferably made of a resin material (e.g., liquid crystal polymer) covers an outer circumference of the sleeve 1211. The seal cap 1213 is arranged at an upper portion of the sleeve 1211 at an inner side of the sleeve housing 1212.

The sleeve 1211 is a porous member. The sleeve housing 1212 retains lubricating oil impregnated in the sleeve 1211. The shaft 112 which is inserted in the sleeve 1211 is rotatably supported by the sleeve portion 121 via the lubricating oil. The stator 114 preferably includes a core preferably made by laminating a plurality of silicon steel plates, and a plurality of coils each formed by winding a conductive wire around a plurality of teeth arranged at the core.

The motor 1 includes the lubricating oil in a continuous manner between an inner side surface of the seal cap 1213 and an outer side surface of the shaft 112, an inner side surface of the sleeve 1211 and the outer side surface of the shaft 112, a top surface, side surface and a bottom surface of the thrust plate 1114 and a bottom surface of the sleeve 1211, and an inner side surface and an inner bottom surface of the sleeve housing 1212.

The inner side surface of the seal cap 1213 is inclined with respect to the outer side surface of the shaft 112 forming a tapered seal so as to prevent the lubricating oil from leaking outward.

The sleeve 1211 includes at a bottom surface thereof a plurality of grooves of a spiral shape, or the like, so as to generate, when the rotor portion 11 rotates, pressure in the lubricating oil toward the central axis J1. A thrust dynamic pressure bearing portion is formed between the bottom surface of the sleeve 1211 and a top surface of the thrust plate 1114.

Also, a plurality of grooves of a herringbone shape, or the like, are formed at opposing surfaces of the shaft 112 and the sleeve 1211 so as to generate fluid dynamic pressure in the lubricating oil.

The rotor portion 11 of the motor 1 is supported in a non-contact manner by the bearing mechanism 12 using the fluid dynamic pressure, and therefore, the rotor portion 11 and the storage medium 21 attached thereto each are quietly rotated with preferable precision.

Figure 3:
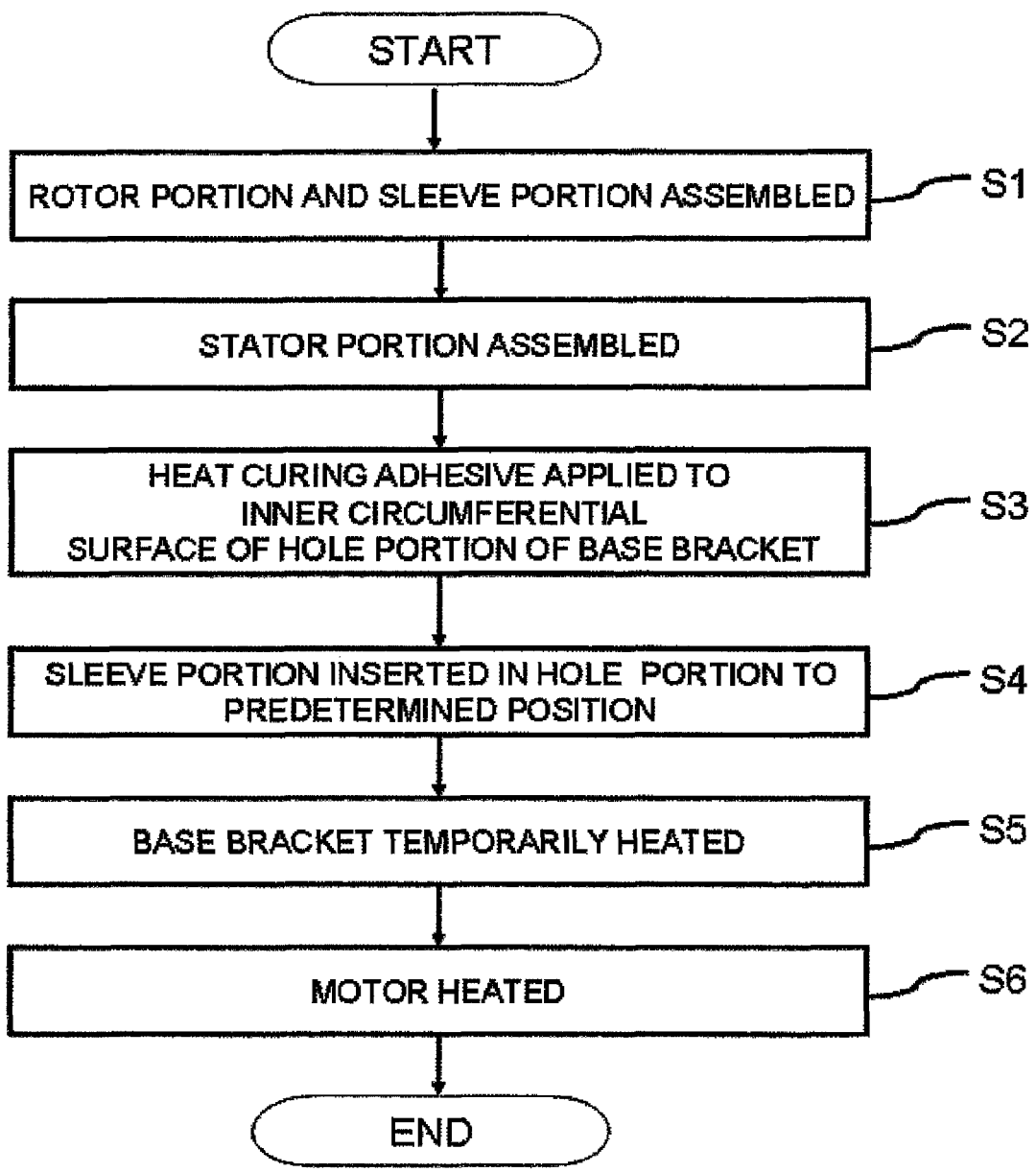
FIG. 3 is a flowchart showing an exemplary flow of manufacturing the motor.
Figure 4:
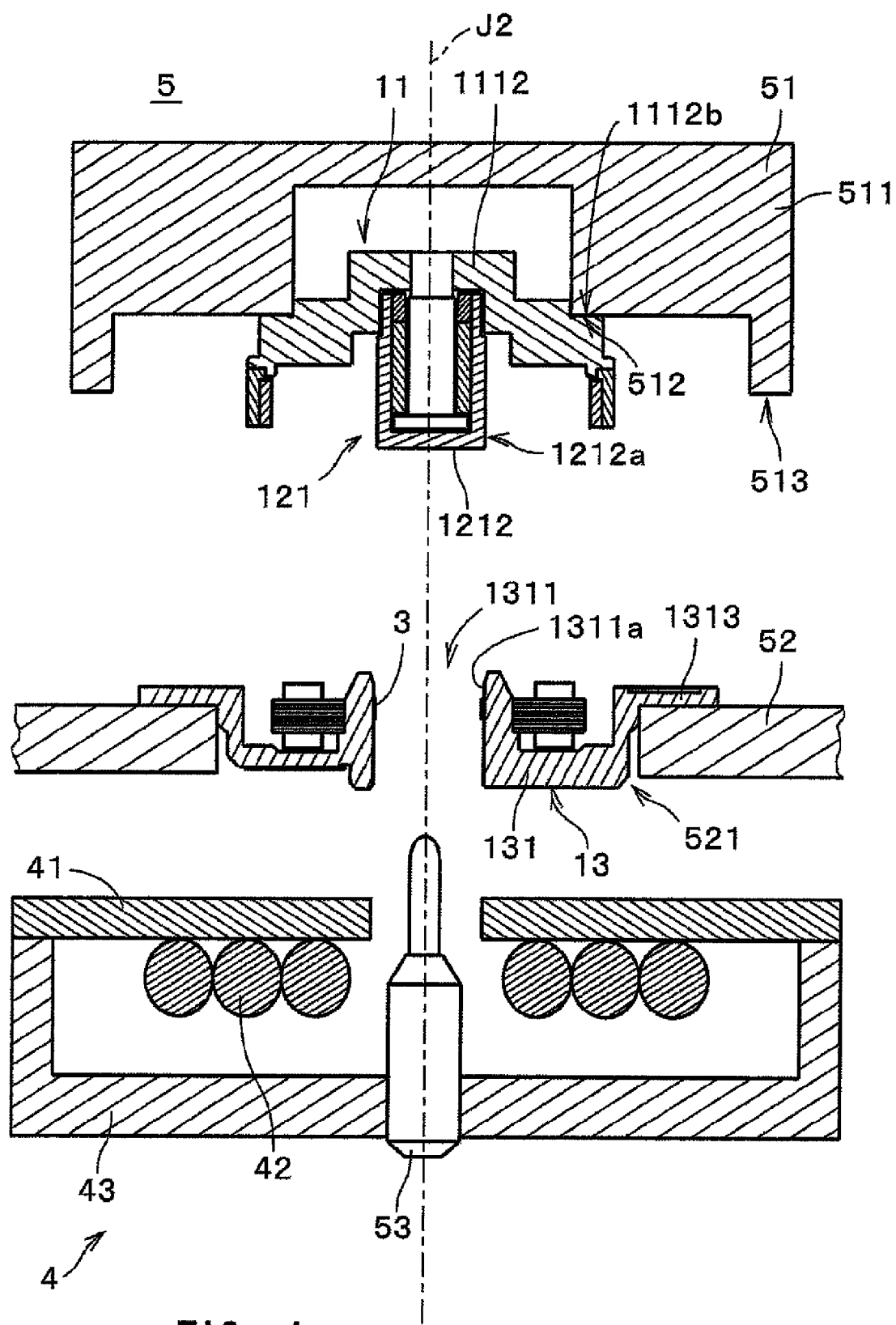
FIG. 4 is a diagram showing a motor in a process of being manufactured.

FIG. 3 is a flowchart showing an exemplary flow of steps of manufacturing the motor 1. In particular, FIG. 3 indicates a latter portion of the manufacturing flow. FIG. 4 is a diagram showing the motor 1 in the manufacturing process.

First, the rotor portion 11 and the sleeve portion 121 of the motor 1 are assembled (step S1). Next, the stator portion 13 is assembled (step S2). Then, an adhesive 3 of the heat curing type of a single component and a fast curing type is applied on the hole portion 1311 of the base bracket 131 (step S3).

Then, as shown in FIG. 4, the rotor portion 11 and the sleeve portion 121 are retained by a rotor retaining portion 51 of a position determining jig 5. Also, the stator portion 13 is retained by the stator retaining portion 52 below the rotor portion 11. Note that the sleeve portion 121, the rotor portion 11 and the stator portion 13 each are aligned with a central axis J2.

The rotor retaining portion 51 preferably includes an annular portion 511 which protrudes in the downward direction. The annular portion 511 fits the hub 1112 so that the rotor portion 11 is retained by the rotor retaining portion 51. The annular portion 511 preferably includes a first contact surface 512 which makes contact with the disk mounting portion 1112b and a second contact surface 513 which makes contact with the stator retaining portion 52.

The stator retaining portion 52 of a substantially plate shape arranged at a predetermined position preferably includes a hole portion 521. A bottom portion of the base bracket 131 is fit in the hole portion 521, wherein a bottom surface (hereinafter, referred to as a position determining surface) of the flange portion 1313 of the base bracket 131 makes contact with a top surface of the stator retaining portion 52 such that the stator portion 13 is retained by the stator retaining portion 52.

A heating portion 4 preferably including an insulating plate 41, an induction coil 42 and a frame 43 is arranged below the base bracket 131. The insulating plate 41 is arranged opposite from a bottom surface of the base bracket 131. The induction coil 42 is arranged at a bottom surface of the insulating plate 41. The frame 43 supports the insulating plate 41 from therebelow.

The insulating plate 41 is preferably made of glass epoxy resin. The frame 43 has attached thereon a spring plunger 53 which is a portion of the position determining jig 5. A tip of the spring plunger 53 is arranged in the hole portion 1311.

Once the rotor portion 11 and the stator portion 13 are retained, the rotor portion 11 and the rotor retaining portion 51 are lowered along the central axis J2, and then the sleeve portion 121 which is connected to the rotor portion 11 are inserted in the hole portion 1311 of the base bracket 131 (step S4).

The adhesive 3 which is applied to an inner circumferential surface 1311a of the hole portion 1311 will be, when the sleeve portion 121 is inserted therein, spread between an outer circumferential surface 1212a of the sleeve housing 1212 and the inner circumferential surface 1311a of the hole portion 1311. Then, as shown in FIG. 2, an excess portion of the adhesive 3 (hereinafter, referred as adhesive 3a) will be retained at a portion between the bottom surface of the sleeve housing 1212 and the inner circumferential surface 1311a of the hole portion 1311.

The second contact surface 513 of the rotor retaining portion 51 will make contact with the top surface of the stator retaining portion 52, the rotor portion 11 will move to a predetermined position, and then a position the rotor retaining portion 51 with respect to the stator retaining portion 52 will be determined.

Figure 5:
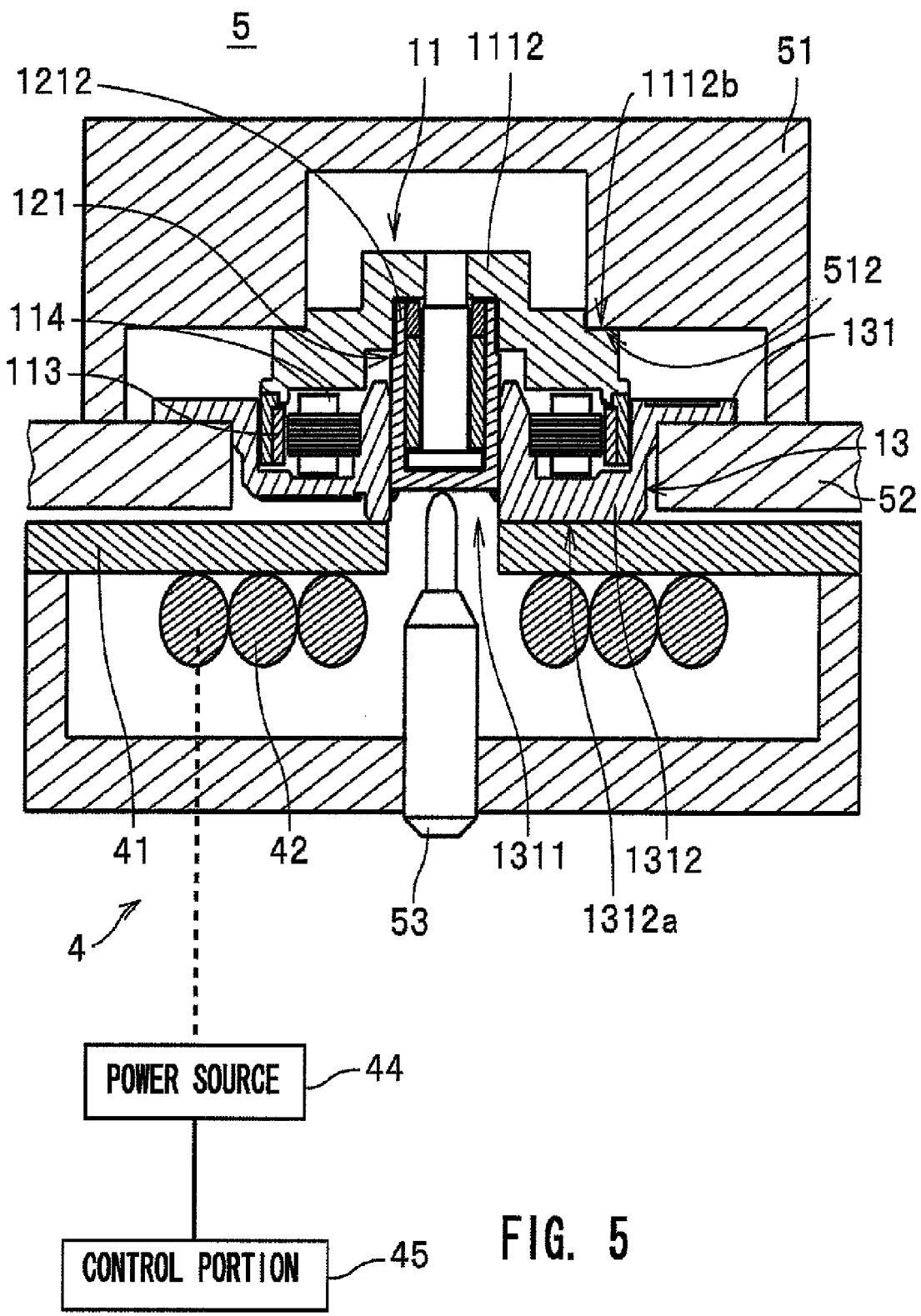
FIG. 5 is a diagram showing a motor in a process of being manufactured.

Then, the heating portion 4 will be moved toward the base bracket 131 as shown in FIG. 5. Then the tip of the spring plunger 53 will make contact with the bottom surface of the sleeve housing 1212, and thereby forcing the sleeve portion 121 and the rotor portion 11 in the upward direction.

By virtue of such configuration, the disk mounting portion 1112b of the hub 1112 will reliably make contact with the first contact surface 512 of the rotor retaining portion 51 without being influenced by a magnetic attraction between the rotor magnet 113 and the stator 114. Further, a position of the sleeve portion 121 with respect to the rotor portion 11 will be determined.

Also, by virtue of such configuration, a position of the rotor portion 11 and a position of the sleeve portion 121 with respect to the base bracket 131 will be precisely determined.

As shown in FIG. 5, the heating portion 4 making contact with the bottom surface 1312a of the bottom portion 1312 is connected to a power source 44 which is connected to a control portion 45 for controlling the power source 44, and which supplies an alternating current of high frequency to the induction coil 42.

After the insertion of the sleeve portion 121 is complete, power supply to the induction coil 42 begins. At this point, since an induced current of high frequency is generated at the bottom portion 1312, while the induction coil 42 and the base bracket 131 are electrically insulated from one another by the insulating plate 41, the bottom portion 1312 including a surrounding area of the hole portion 1311 will be temporarily heated (step S5).

Figure 6:
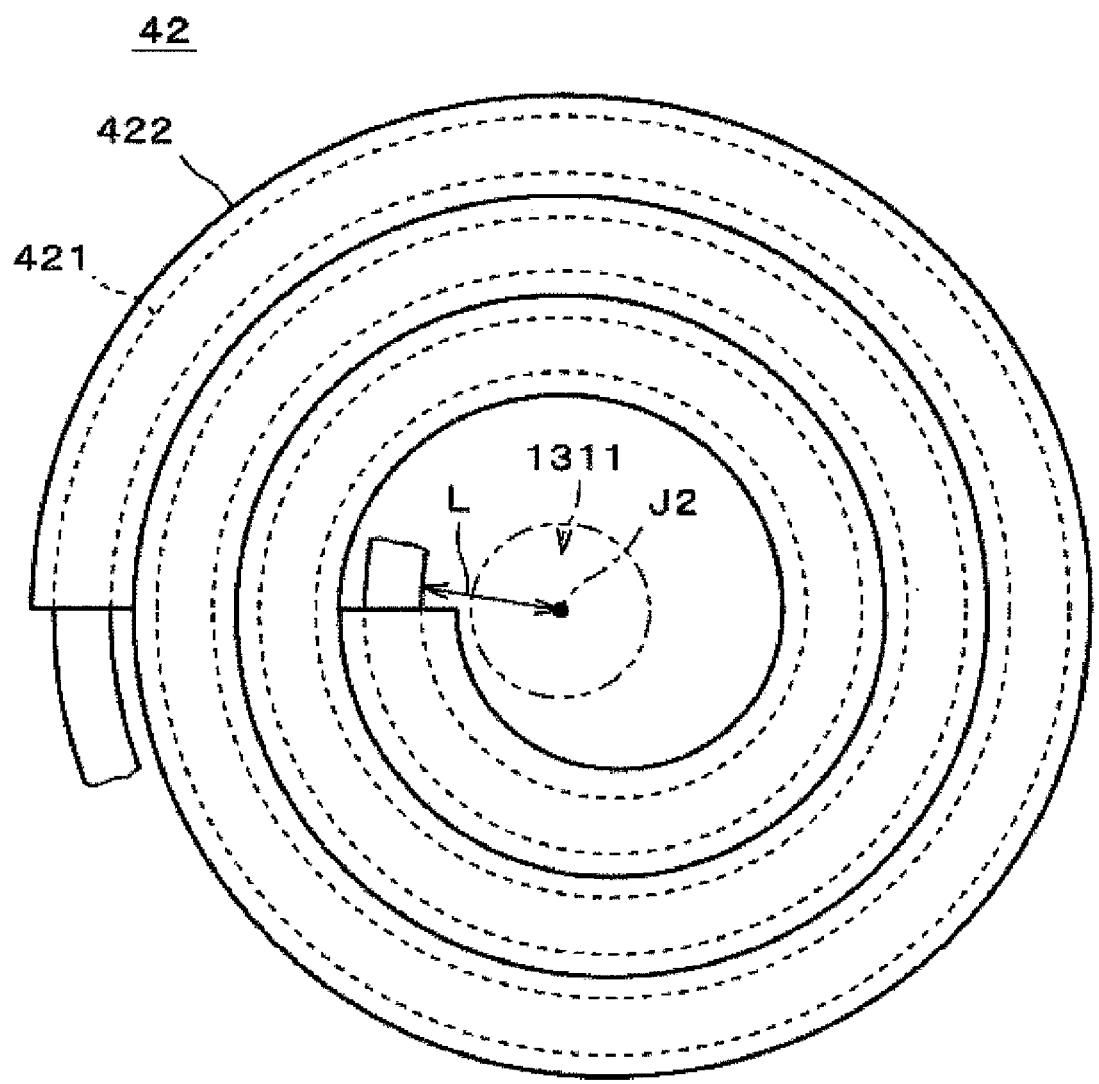
FIG. 6 is a plan view of an inductance coil.

FIG. 6 is a plan view of the induction coil 42. The induction coil 42 is formed in a spiral manner starting from the hole portion 1311 (indicated by a chain double dashed line) in an outward direction.

The induction coil 42 preferably includes a conductive wire 421 through which high frequency current is supplied from the power source 44, and a covered portion 422 which covers the conductive wire 421 so as to insulate the conductive wire 421. The induction coil 42 and the base bracket 131 are completely insulated from one another by the insulating plate 41 (see FIG. 5) and the covered portion 422. It is preferable that a shortest distance, L, between the conductive wire 421 and the central axis J2 is greater than a radius of the hole portion 1311.

Note that if the conductive wire 421 and the base bracket 131 are already insulated from one another, the covered portion 422 may be omitted. Also, the conductive wire 421 may be arranged near the base bracket 131 in a non-contact manner without arranging the insulating plate 41 or the covered portion 422.

An induction heating by the induction coil 42 controlled by the control portion 45 (shown in FIG. 5) is conducted for approximately 10 to 15 seconds. By virtue of such configuration, the bottom portion 1312 of the base bracket 131 is heated effectively so as to harden a portion of the adhesive 3. Consequently, the sleeve portion 121 will be affixed to the base bracket 131.

Figure 7:
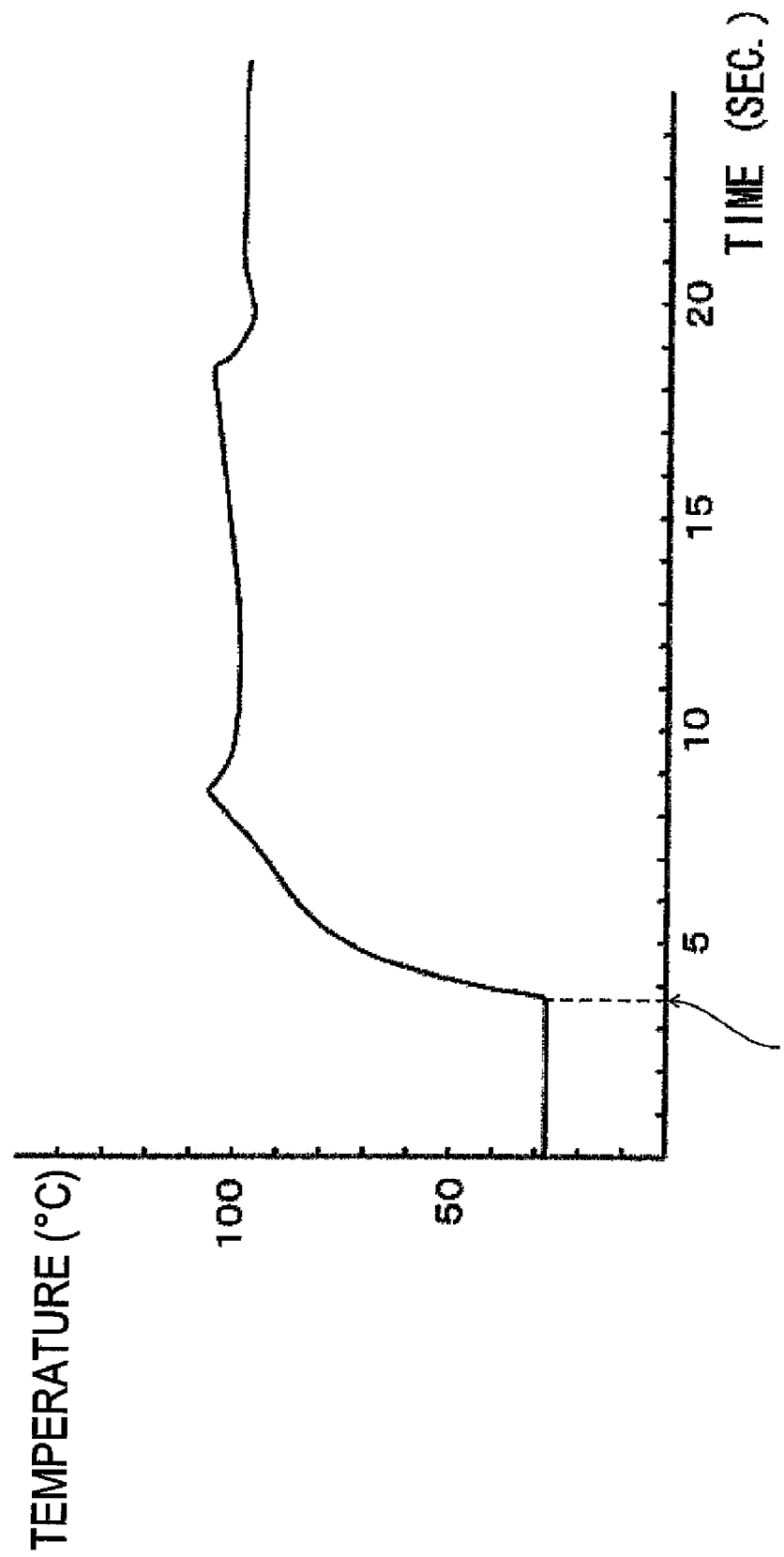
FIG. 7 is a graph indicating a change in temperature of a base bracket.

FIG. 7 is a graph indicating a change, due to the induction heating, in temperature of the base bracket 131. The change in the temperature is measured by a thermocouple attached to the inner circumferential surface 1311a.

According to the induction heating shown in FIG. 7, the base bracket 131 is heated by the high frequency power source (20 kilowatt, 100 kilohertz) and controlled by the control portion 45 such that the temperature thereof reaches approximately 110° C. in approximately 5 seconds and the temperature thereafter remains approximately at 100° C. to 110° C. for approximately 10 seconds. Then, the heating is finished and the temperature of the base bracket 131 starts to decrease. As described above, an initial fixation is completed in which the adhesive 3 is cured in a short amount of time while the rotor portion 11, stator portion 13 and the sleeve portion 121 are arranged at a predetermined position by the position determining jig 5.

Note that the temperature control is not limited to as described in FIG. 7; for example, if a joining of the base bracket 131 and the sleeve portion 121 is executed one after another, the high frequency current from the power source 44 may be kept at a predetermined level wherein the heating begins when the base bracket 131 approaches or makes contact with the heating portion 4, and the heating ends when a distance between the base bracket 131 and the heating portion 4 is widened. Also, since the heating takes place in a short amount of time, the temperature used for the heating may exceed an optimal curing temperature of the adhesive 3.

As described above, according to the present invention, curing of the adhesive 3 used for the initial fixation of the surrounding area of the hole portion 1311 and the bottom surface of the base bracket 131 is conducted at a low cost. Also, the heating is easily conducted since the induction heating method is used. In general, since the induction heating heats up a surface of an object to be heated intensely, but mildly in an inside of the object, components of the motor 1 other than the base bracket 131 will not be heated. In particular, a temperature increase in the rotor magnet 113 which may cause demagnetization of the rotor magnet 113 can be minimized.

Further, since the induction heating is conducted at the area surrounding the hole portion 1311 of the base bracket 131, deformation of the base bracket 131 will be minimized. Also, the sleeve portion 121 will not be heated unnecessarily. Therefore, an oil leakage which happens when an entire motor 1 is heated at a high temperature can be minimized improving a yield rate of the motor 1. Also, since the sleeve housing 1212 is made of a non-conductive resin material, the sleeve portion 121 will not be subject to the heating.

When the initial fixation of the sleeve portion 121 is complete, a secondary fixation begins in which the rotor portion 11 and the stator portion 13 are removed from the position determining jig 5, and placed in an oven set at 90° C. for approximately for 1 hour. By this, the sleeve portion 121 and the base bracket 131 will be heated entirely curing the adhesive 3 completely which securely joins the sleeve portion 121 with the base bracket 131 (step S6). Above concludes the secondary fixation. Note that a temperature of the secondary fixation is set a level which is not influential to the rotor magnet 113 and the bearing mechanism 12.

Note that the adhesive 3 is a single component epoxy having an epoxy based component as a sole adhesive component thereof, and therefore, a generation of an outgass, which may occur due to a long duration of the secondary fixation, is minimized.

By virtue of such configuration, reliability of the disk drive apparatus 2 having therein the motor 1 will be improved. Also, since the adhesive of heat curing type, in particular, the epoxy based adhesive is used, a secure bonding of the components will be achieved improving the yield rate.

Further, when the sleeve housing 1212 is made of a resin material, inconsistence bonding may occur as a result of a use of an anaerobic adhesive or a primer. On the other hand, using the epoxy based adhesive allows a desirable bonding with the sleeve housing 1212 made of the resin material. The motor manufactured as described above is suitable in a disk drive apparatus required to have predetermined shock resistance (e.g., mobile instrument, automobile part, or the like).

Also, since the initial fixation is conducted, the secondary fixation for the base bracket 131, the rotor portion 11 and the sleeve portion 121 can be conducted without large scale expensive jig. Also, the amount of time for the secondary fixation can be reduced. Therefore, productivity of the motor will be improved while a number of jigs necessary for the manufacture will be reduced. Also, a space within the oven will be utilized effectively thereby reducing the manufacturing cost.

Also, since the adhesive 3 of the heat curing type of the single component and the fast curing type is used in the initial fixation stage, the sleeve portion 121 and the base bracket 131 are effectively and securely joined together in a short amount of time. Also, since the adhesive 3 is a single component type, the manufacturing process is simplified compared with when a two component adhesive is used.

In particular, the adhesive 3 is preferably such that a cure time thereof is under approximately 15 seconds at approximately 110° C. based on a test defined under C6521-1996 in the Japanese Industrial Standards.

According to the test mentioned above, an adhesive is applied on a platen which is heated to a predetermined temperature, the adhesive is stirred using a tool, and then once the viscosity of the adhesive increases the tool is repeatedly lifted to a predetermined height off and from the heated platen. The test then measures an amount of (average) time (e.g., cure time) until a stringy adhesive between the lifted tool and the platen snaps.

Note that the manufacturing method in which the induction heating is used for the initial fixation is applicable to a motor in which the base bracket 131 is formed integrally with the second housing member 231 of the housing 23. In such motor, the heating portion 4 will make contact with the bottom surface of the second housing member 231 (hereinafter, referred to as "base plate"), and the second contact surface 513 of the rotor retaining portion 51 (see FIGS. 4 and 5) will make, when being lowered, a direct contact with the second housing member 231.

Figure 8:
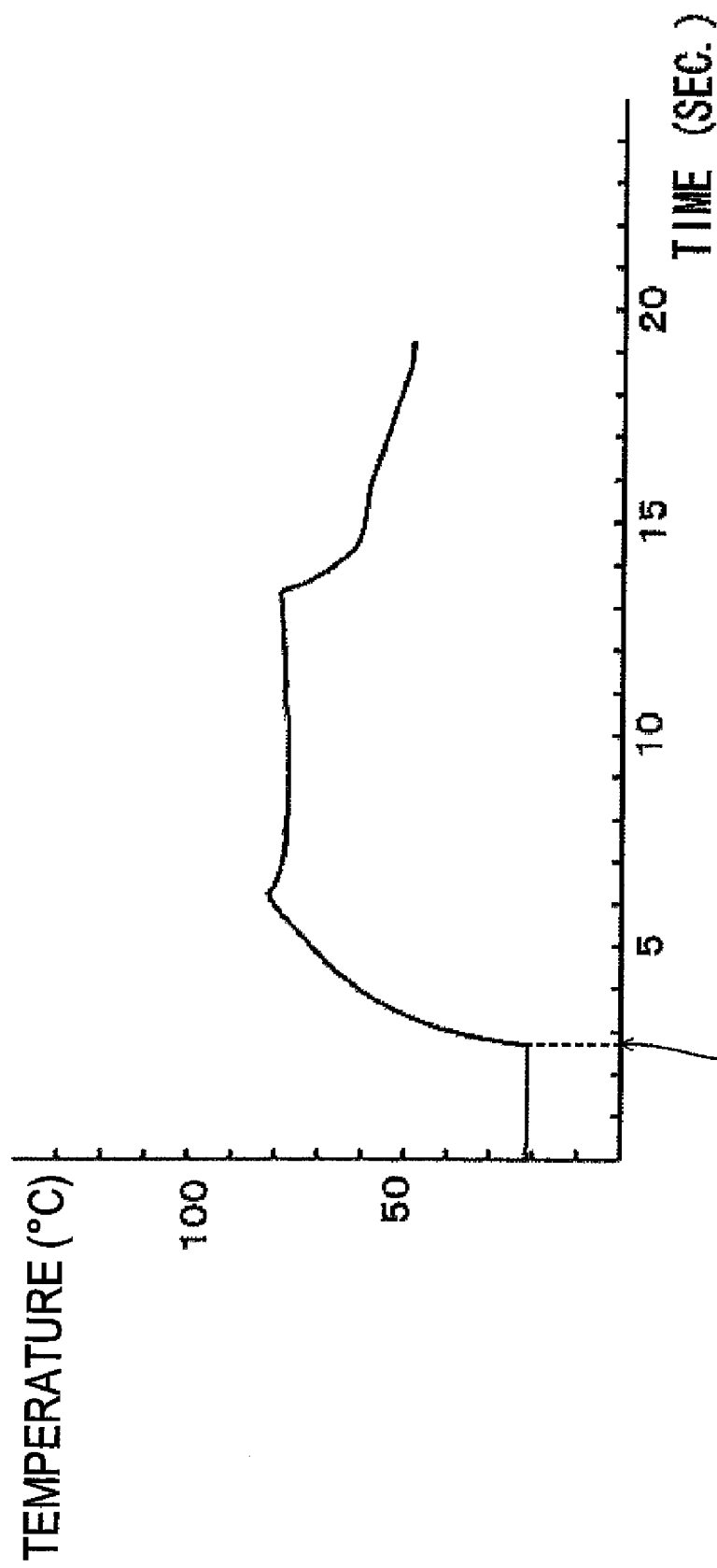
FIG. 8 is a graph indicating a change in temperature of a base plate.

FIG. 8 is a graph indicating a change in temperature of the base plate as an effect of the induction heating. According to the heating as indicated in FIG. 8, an area surrounding a hole portion through which the sleeve portion 121 is inserted is heated, in the same manner as that in FIG. 7, such that the temperature thereof reaches approximately 100° C. in approximately 5 seconds and the temperature thereafter is maintained for approximately 10 seconds. However, once the induction heating stops, the area surrounding the hole portion is dissipated conductively, and therefore, the temperature thereof decreases quicker than what is shown in FIG. 7.

SECOND PREFERRED EMBODIMENT

Figure 9:
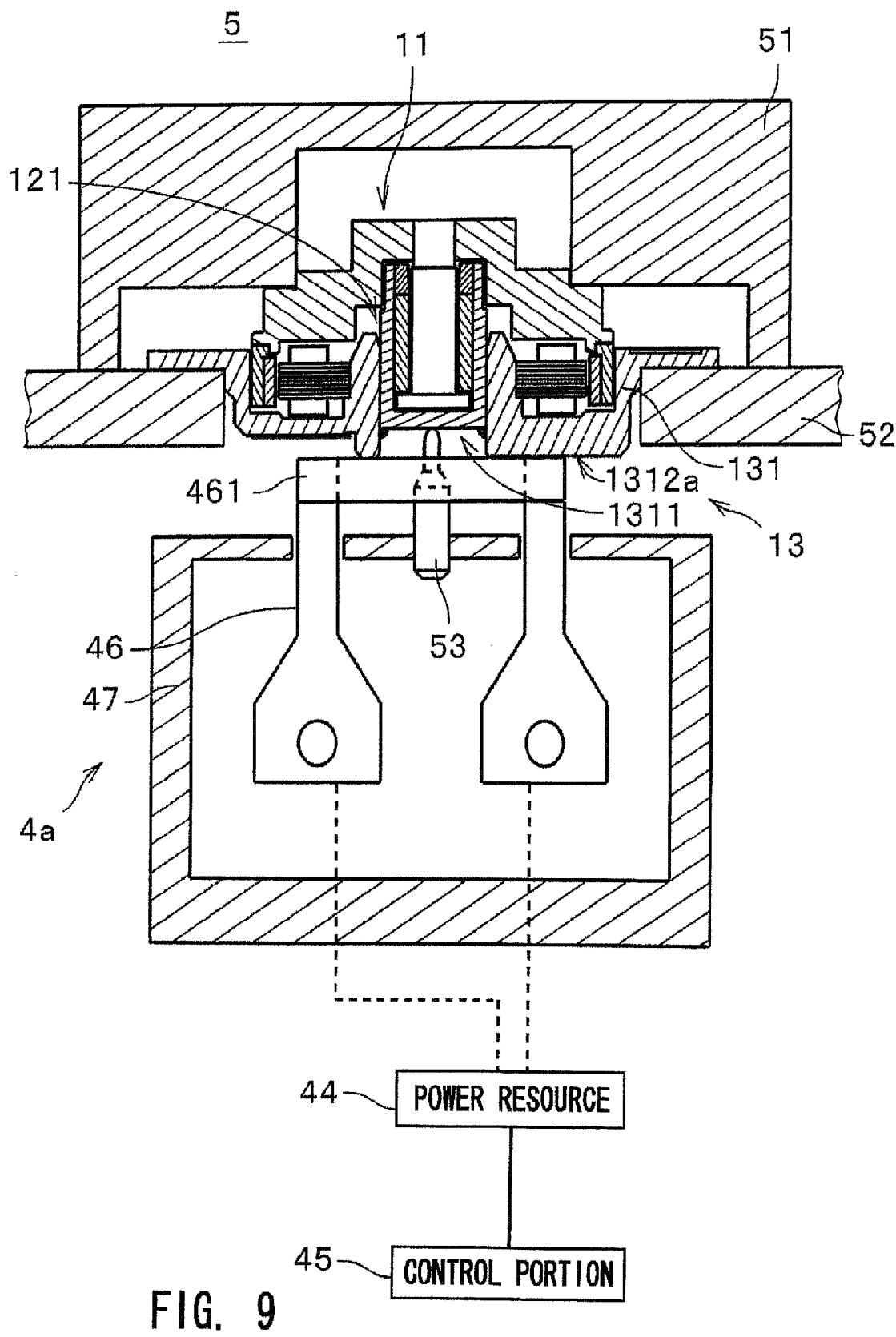
FIG. 9 is a diagram showing a motor in a process of being manufactured.

FIG. 9 is a diagram showing a heating portion used in the initial fixation according to a second preferred embodiment of the present invention. Note that FIG. 9 corresponds to FIG. 5.

Note that in the description of the second preferred embodiment of the present invention herein, elements similar to those illustrated for the description of the first preferred embodiment of the present invention are denoted by similar reference numerals and descriptions thereof is omitted. Also, note that the manufacturing procedure according to the second preferred embodiment is same as that for the first preferred embodiment except that the initial fixation is conducted by using a heating portion 4a shown in FIG. 9 is used.

The heating portion 4a shown in FIG. 9 preferably includes a heating tool 46 of a pulse heating type instead of the induction coil 42. A tip portion 461 of the heating tool 46 has a substantially annular shape.

A portion of the heating tool 46 other than the tip portion 461 is covered by a housing 47 of the heating tool 46. Electrodes of the heating tool 46 are secured in the housing 47 and are connected to the power source 44 which is connected to the control portion 45. The spring plunger 53 which is secured by the housing 47 is arranged in a central hole of the tip portion 461.

When the initial fixation is conducted, the rotor portion 11 of the motor 1 will be retained by the rotor retaining portion 51 in the same manner as shown in FIG. 5. Also, the stator portion 13 on which the adhesive is applied will be retained by the stator retaining portion 52. When the rotor portion 11 is lowered until the rotor retaining portion 51 makes contact with the stator retaining portion 52, the sleeve portion 121 is inserted in the hole portion 1311 of the base bracket 131 (FIG. 3: steps S1 to S4).

Then, the heating portion 4a is raised until the tip portion 461 of the heating tool 46 makes contact with the bottom surface 1312a of the base bracket 131 at the area surrounding the hole portion 1311. At this point, the position of the rotor portion 11 and the position of the sleeve portion 121 with respect to the base bracket 131 will be determined when the spring plunger 53 forces the bottom surface of the sleeve portion 121 in the upward direction in the same manner as shown in FIG. 5. Then, a pulse current will be supplied to the heating tool 46 from the power source 44 controlled by the control portion 45, and thereby heating the area surrounding the hole portion 1311 by the pulse heating method (step S5).

According to the present preferred embodiment, since the initial fixation uses the pulse heat, and the heating tool 41a makes contact directly with the bottom surface 1312a of the base bracket 131, the area surrounding the hole portion 1311 will be heated thereby curing the adhesive effectively and facilitatedly.

Also, since pulse heating apparatus can be purchased at a low cost, the manufacturing cost of the motor 1 can be lowered. After the initial fixation, the motor 1 is removed from the position determining jig 5 and placed and heated in the oven for a predetermined duration of time so as to securely connect the sleeve portion 121 to the base bracket 131 (step S6). This concludes the secondary fixation process. As with the first preferred embodiment as shown in FIG. 5, the space within the oven will be utilized effectively thereby reducing the manufacturing cost.

Note that the manufacturing method in which the initial fixation using the pulse heat is applicable to a motor in which the base bracket 131 is formed integrally with the second housing member 231 of the housing 23.

While preferred embodiment of the present invention have been described above, it is to be understood that variations and modifications will be apparent to those skilled in the art without departing the scope and spirit of the present invention.

For example, although the preferred embodiments assume that the base bracket 131 and the rotor portion 11 are retained after the adhesive 3 is applied on the inner circumferential surface 1311a of the hole portion 1311 of the base bracket 131, this is not limited thereto; the adhesive 3 may be applied after the base bracket 131 and the rotor portion 11 are retained.

Also, although the preferred embodiments assume that the adhesive 3 is applied on the inner circumferential surface 1311a of the hole portion 1311, this is not limited thereto; the adhesive 3 may be applied on an outer circumferential surface of the sleeve portion 121, or on the yoke 1113.

Also, although the preferred embodiments assume that the rotor portion 11 is lowered toward the stator portion 13, the assembly process is not limited thereto; the stator portion 13 may be lifted toward the rotor portion 11. Also, the rotor portion 11 and the stator portion 13 may be turned upside down and have the stator portion 13 lowered, or have the rotor portion 11 lifted toward the stator portion 13.

Although the preferred embodiments assume that the position of the rotor portion 11 with respect to the base bracket 131 is determined immediately after, or simultaneously as, the sleeve portion 121 is inserted into the hole portion 1311, this is not limited thereto; the rotor portion 11 and the stator portion 13 may be retained by the position determining jig 5 after the insertion so as to create a separate step for determining the position.

Also, although the preferred embodiments assume that the induction coil 42 or the pulse heat is used for the heating process, a stick like metal member which is heated by the high frequency induction heating, or the like, may be applied to the bottom surface 1312a of the base bracket 131 so as to heat the hole portion 1311 of the base bracket 131.

Although the preferred embodiments assume that the adhesive 3 is cured completely after the secondary fixation executed after the initial fixation, this is not limited thereto; depending on a position, amount or type of the adhesive 3 used, the adhesive 3 may be cured completely after the initial fixation by the induction heating, pulse heat or the like. If the secondary fixation is omitted from the manufacturing process, the manufacturing efficiency will be further improved.

Note that the sleeve housing 1212 may be made of a metal material. If the sleeve housing 1212 is made of the metal material, it is preferable that the distance L which is the distance between the conductive wire 421 and the central axis as shown in FIG. 6 is extended so as to minimize the eddy induction heating.

Further, the sleeve portion 121 may be a single component sleeve portion. That is, the sleeve 1211 and the sleeve housing 1212 may be formed as a single component. When the sleeve 1211 and the sleeve housing 1212 are formed as the single component, the sleeve may be securely connected by the heat cure adhesive to the base portion even if the sleeve is made of a resin material. Also, when the sleeve is made of the resin material, the bearing mechanism 12 will not be affected by the induction heating.

Note that the bearing mechanism 12 of the motor 1 does not necessarily need to use a fluid dynamic pressure.

What is claimed is:

1. A manufacturing method of a motor in which a sleeve portion into which a shaft is inserted is affixed at a hole portion extending along a central axis arranged in a base portion of a stator portion, the method comprising the steps of:
    applying an adhesive of heat curing type on at least one of an outer circumferential surface of the sleeve portion and an inner circumferential surface of the base portion including the hole portion;
    arranging the hole portion and the sleeve portion in the axial direction and inserting the sleeve portion into the hole portion from an upper side thereof; and
    heating an area surrounding the hole portion by using a heating portion that includes a spring plunger and is arranged near or at a bottom surface of the base portion, a tip of the spring plunger being arranged to extend into the hole portion to contact a bottom surface of the sleeve portion.

2. The manufacturing method of the motor according to claim 1, wherein
    the base portion includes a base bracket made of a conductive material,
    the heating portion includes an induction coil, and
    the area surrounding the hole portion is heated by high frequency induction heating of the induction coil.

3. The manufacturing method of the motor according to claim 2, wherein the induction coil has a spiral shape extending from the area surrounding the hole portion toward an outer side thereof.

4. The manufacturing method of the motor according to claim 2, wherein
the induction coil includes a conductive wire through which high frequency current is supplied from a power source, and
a distance between the conductive wire and the central axis is greater than a radius of the hole portion.

5. The manufacturing method of the motor according to claim 2, wherein
the heating portion includes an insulating plate,
the base portion makes contact with a top surface of the insulating plate, and the induction coil makes contact with a bottom surface of the insulating plate, and
the area surrounding the hole portion is heated by the induction coil via the insulating plate.

6. The manufacturing method of the motor according to claim 5, wherein the insulating plate is made of a glass epoxy resin.

7. The manufacturing method of the motor according to claim 1, wherein the adhesive is a single component adhesive.

8. The manufacturing method of the motor according to claim 7, wherein a cure time of the adhesive is under approximately 15 seconds at approximately 110° C. based on a test defined under C6521-1996 in the Japanese Industrial Standards.

9. The manufacturing method of the motor according to claim 7, wherein the adhesive includes an epoxy based component as a sole adhesive component thereof.

10. The manufacturing method of the motor according to claim 1, wherein the adhesive includes an epoxy based component as a sole adhesive component thereof.

11. The manufacturing method of the motor according to claim 1, the method further comprising, prior to the step of applying the adhesive, the steps of:
assembling a rotor portion including the sleeve portion and the shaft; and
assembling the stator portion, wherein
a position of the rotor portion with respect to the base portion is determined during the inserting step.

12. The manufacturing method of the motor according to claim 11, wherein
the rotor portion includes a disk mounting portion on which a plate shaped recording medium is arranged,
the base portion includes a position determining surface arranged at a side of the base portion an axially opposite from a side the sleeve portion is inserted,
a position of the rotor portion is determined during the inserting step by setting a predetermined axial distance between the disk mounting portion and the position determining surface.

13. The manufacturing method of the motor according to claim 1, further comprising a step of heating the base portion including the sleeve portion after the step of heating the area surrounding the hole portion.

14. The manufacturing method of the motor according to claim 1, wherein the heating portion includes a heating tool heated using a pulse heat method, and
the heating tool makes contact with the bottom surface of the base portion during the step of heating the area surrounding the hole portion.

15. The manufacturing method of the motor according to claim 1, wherein
the sleeve portion includes a sleeve having a substantially cylindrical shape concentric with the central axis, and a sleeve housing made of a resin material arranged to cover an outer circumference of the sleeve.

16. The manufacturing method of the motor according to claim 1, wherein the sleeve portion is a sleeve made of a resin material arranged to support the shaft.

* * * * *